(12) United States Patent
Furukawa et al.

(10) Patent No.: US 12,044,616 B2
(45) Date of Patent: Jul. 23, 2024

(54) DETECTION APPARATUS

(71) Applicant: TOYOTA JIDOSHA KABUSHIKI KAISHA, Toyota (JP)

(72) Inventors: Masashi Furukawa, Toyota (JP); Koyo Ueda, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 274 days.

(21) Appl. No.: 17/854,959

(22) Filed: Jun. 30, 2022

(65) Prior Publication Data

US 2023/0044993 A1 Feb. 9, 2023

(30) Foreign Application Priority Data

Aug. 4, 2021 (JP) .................................. 2021-128316

(51) Int. Cl.
*G01N 21/19* (2006.01)
*G01N 21/95* (2006.01)
*G02B 7/00* (2021.01)

(52) U.S. Cl.
CPC .............. *G01N 21/19* (2013.01); *G01N 21/95* (2013.01); *G01N 2021/9511* (2013.01); *G02B 7/003* (2013.01)

(58) Field of Classification Search
CPC ........ G01N 21/19; G01J 3/0291; G02B 7/003
See application file for complete search history.

(56) References Cited

FOREIGN PATENT DOCUMENTS

JP   2012-035307 A   2/2012

OTHER PUBLICATIONS

Sylwia Stopka, "High-Throughput Analysis of Tissue-Embedded Single Cells by Mass Spectrometry with Bimodal Imaging and Object Recognition", 2021 (Year: 2021).*
Thorlabs, https://www.thorlabs.com/newgrouppage9.cfm?objectgroup_id=12315, Oct. 26, 2020 (Year: 2020).*
Item, "Ball-Bush Block Set 8", 2014, Benjamin D. Grant, "High-Resolution Microendoscope for the Detection of Cervical Neoplasiaz", 2015 (Year: 2015).*
& Benjamin D. Grant, "High-Resolution Microendoscope for the Detection of Cervical Neoplasiaz", 2015 (Year: 2015).*

* cited by examiner

*Primary Examiner* — Maurice C Smith
(74) *Attorney, Agent, or Firm* — Oblon, McClelland, Maier & Neustadt, L.L.P.

(57) ABSTRACT

A detection apparatus according to one aspect of this disclosure includes: two or more housings connectable to each other; a first photodetector connectable to a corresponding one of the two or more housings; and a second photodetector connectable to a corresponding one of the two or more housings. Each of the housings includes a first connecting portion to which the first photodetector is connectable, a second connecting portion to which the second photodetector is connectable, and a third opening facing the first connecting portion. At least one of the housings includes a dichroic mirror placed between a first opening and the third opening. The dichroic mirror allows light having a first wavelength in incident light from the third opening to pass through the dichroic mirror toward the first opening, while the dichroic mirror reflects light having a second wavelength in the incident light toward the second opening.

6 Claims, 7 Drawing Sheets

DETECTION APPARATUS

CROSS-REFERENCE TO RELATED APPLICATION

This application claims priority to Japanese Patent Application No. 2021-128316 filed on Aug. 4, 2021, incorporated herein by reference in its entirety.

BACKGROUND

1. Technical Field

This disclosure relates to a detection apparatus and, for example, relates to a detection apparatus configured to detect returned light of a laser beam applied to a reflector.

2. Description of Related Art

Generally, in a case where a welding state at a processing point of laser beam welding is determined, returned light of a laser beam from the processing point is detected by a detection apparatus, and the quality of the welding state at the processing point is determined based on a detected light intensity, as described in Japanese Unexamined Patent Application Publication No. 2012-35307 (JP 2012-35307 A).

At this time, a general detection apparatus is configured to guide light to a sensor (a photodetector) via a mirror in a housing, and the arrangement of the photodetector is fixed.

SUMMARY

The applicants of the present disclosure found the following problems. In a general detection apparatus, the arrangement of a photodetector is fixed, and therefore, there is such a problem that the arrangement of the photodetector cannot be changed appropriately, for example.

This disclosure is accomplished in view of the above problem, and an object of this disclosure is to achieve a detection apparatus in which the arrangement of a photodetector can be changed appropriately.

A detection apparatus according to one aspect of this disclosure is a detection apparatus for detecting returned light of laser light applied to a reflector. The detection apparatus includes two or more housings, a first photodetector, and a second photodetector. The two or more housings are connectable to each other. The first photodetector is connectable to a corresponding one of the two or more housings. The second photodetector is connectable to a corresponding one of the two or more housings. Each of the two or more housings includes: a first opening formed in the each of the two or more housings; a first connecting portion to which the first photodetector is connectable such that the first photodetector detects light incident on the first opening, the first connecting portion being placed on a surface of the each of the two or more housings, the surface being a surface where the first opening is formed; a second opening formed in the each of the two or more housings; a second connecting portion to which the second photodetector is connectable such that the second photodetector detects light incident on the second opening, the second connecting portion being placed on a surface of the each of the two or more housings, the surface being a surface where the second opening is formed; and a third opening formed in the each of the two or more housings such that the third opening faces the first connecting portion. At least one of the two or more housings includes a dichroic mirror placed between the first opening and the third opening. The dichroic mirror allows light having a first wavelength in incident light from the third opening to pass through the dichroic mirror toward the first opening, while the dichroic mirror reflects light having a second wavelength in the incident light toward the second opening.

In the detection apparatus, the first connecting portion may include a first internal threaded portion formed on a peripheral surface of the first opening of the each of the two or more housings. An external threaded portion formed in the first photodetector may be screwed into the first internal threaded portion such that the each of the two or more housings is connected to the first photodetector.

In the detection apparatus, the second connecting portion may include a second internal threaded portion formed on a peripheral surface of the second opening of the each of the two or more housings. An external threaded portion formed in the second photodetector may be screwed into the second internal threaded portion such that the each of the two or more housings is connected to the second photodetector.

In the detection apparatus, the each of the two or more housings may include a third connecting portion to which either of the first photodetector and the second photodetector is connectable such that the either of the first photodetector and the second photodetector detects light incident on the third opening, the third connecting portion being placed on a surface of the each of the two or more housings, the surface being a surface where the third opening is formed.

In the detection apparatus, the third connecting portion may include a third internal threaded portion formed on a peripheral surface of the third opening of the each of the two or more housings. An external threaded portion formed in the first photodetector or an external threaded portion formed in the second photodetector may be screwed into the third internal threaded portion such that the each of the two or more housings is connected to a corresponding one of the first photodetector and the second photodetector.

The detection apparatus may include a connecting plate by which the two or more housings are connected to each other. The connecting plate may be placed to sandwich the two or more housings.

With this disclosure, it is possible to achieve a detection apparatus in which the arrangement of photodetectors can be changed appropriately.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

A concrete embodiment to which this disclosure is applied will be described in detail with reference to the drawings. Note that this disclosure is not limited to the following embodiment. Further, the following description and drawings are simplified appropriately to make the description clear.

Embodiment 1

First described is a configuration of a detection apparatus of the present embodiment. The detection apparatus according to the present embodiment is preferably used to detect returned light from a processing point of laser beam welding at the time when the quality of a welding state at the processing point is determined, for example.

Figure 1:
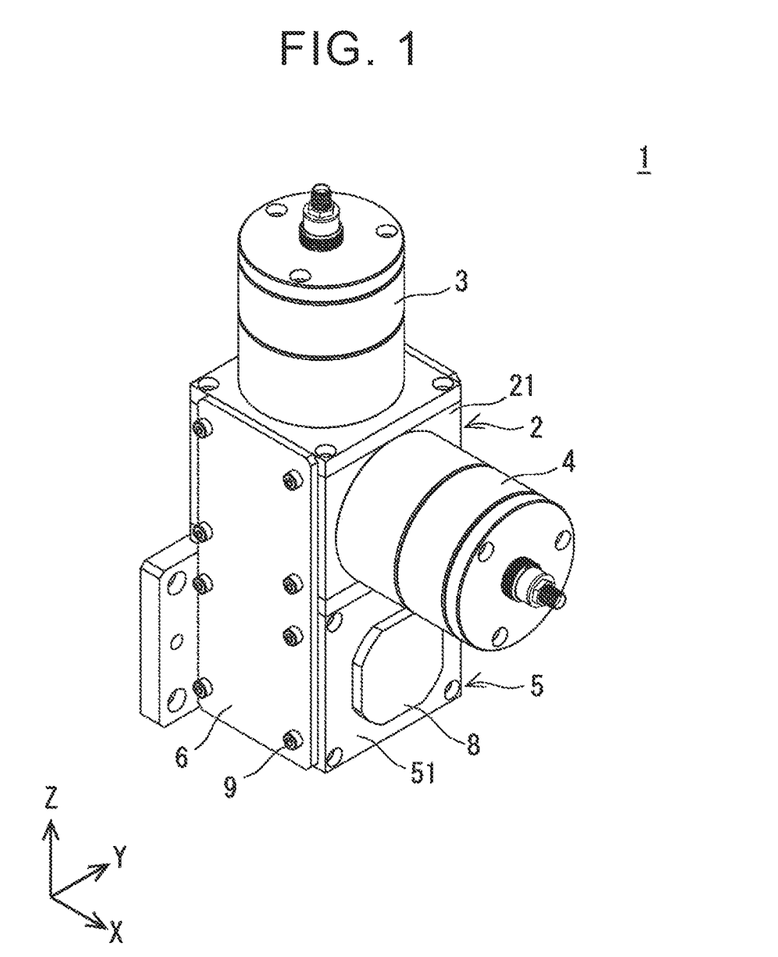
FIG. 1 is a perspective view illustrating a detection apparatus according to an embodiment.
Figure 2:
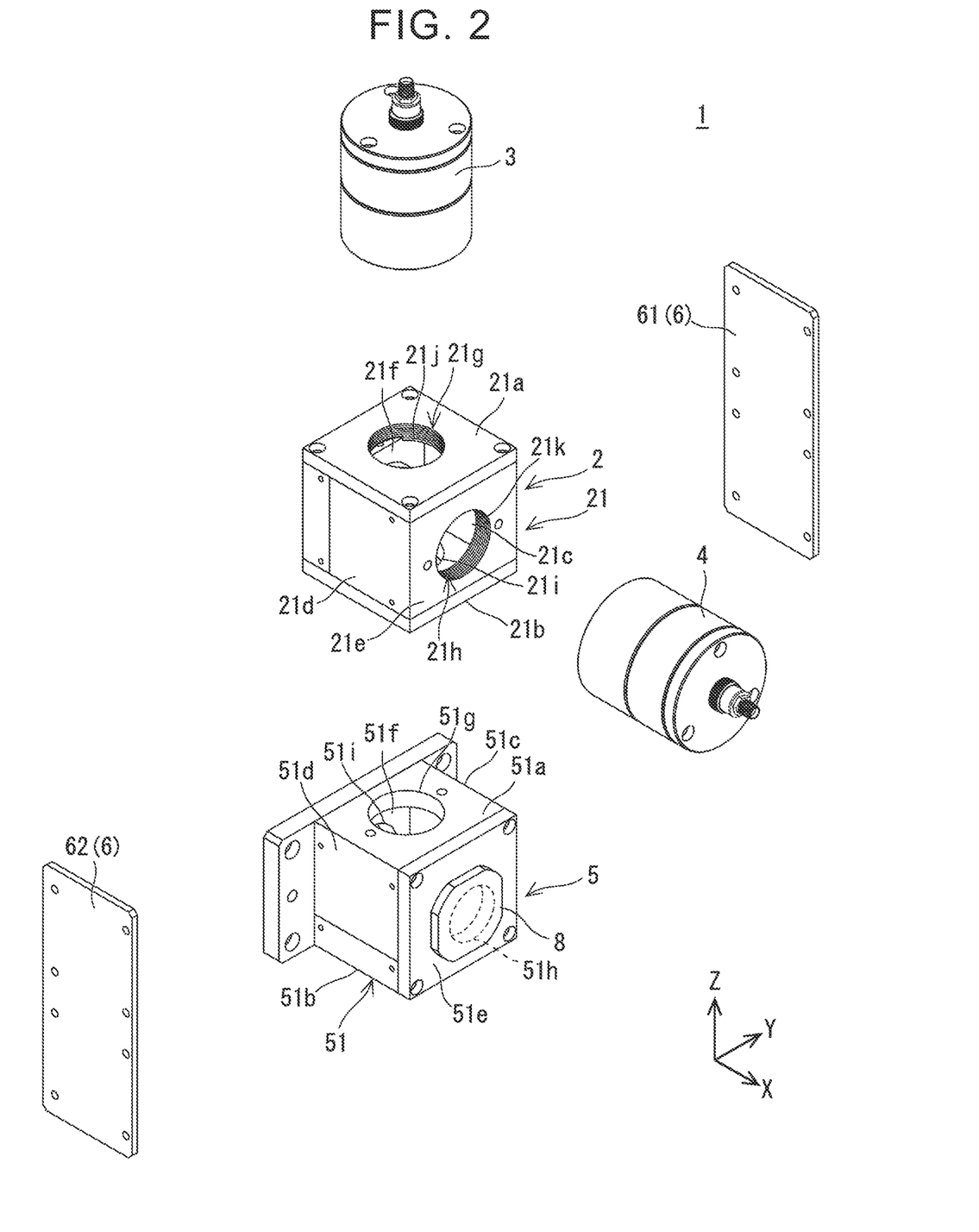
FIG. 2 is an exploded view illustrating the detection apparatus according to the embodiment.
Figure 3:
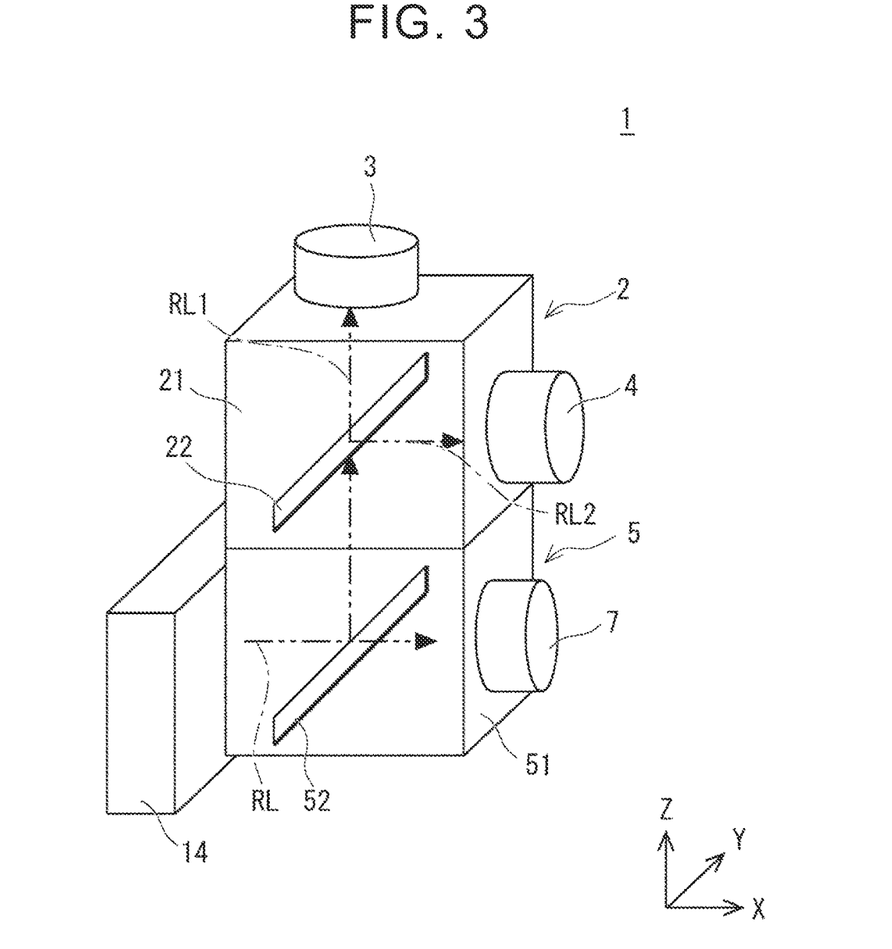
FIG. 3 is a view to describe the path of light of the detection apparatus according to the embodiment.
Figure 4:
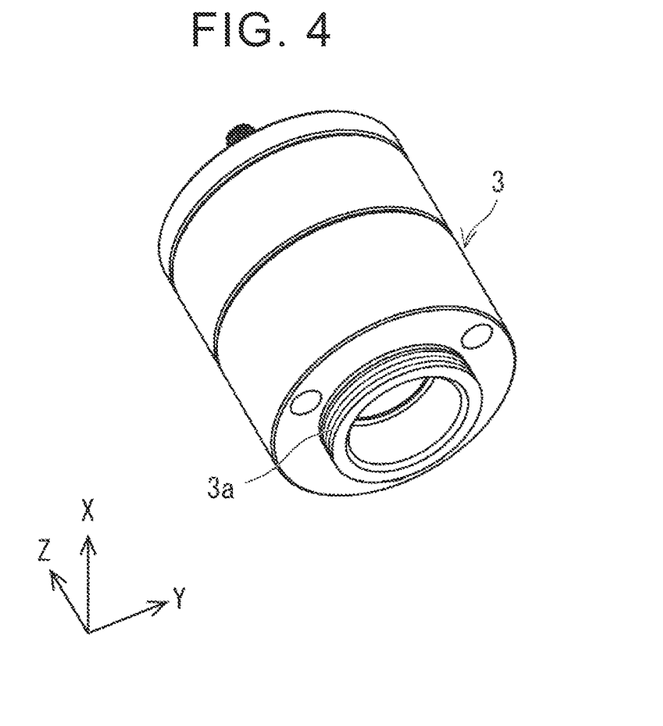
FIG. 4 is a perspective view illustrating a first photodetector according to the embodiment.
Figure 5:
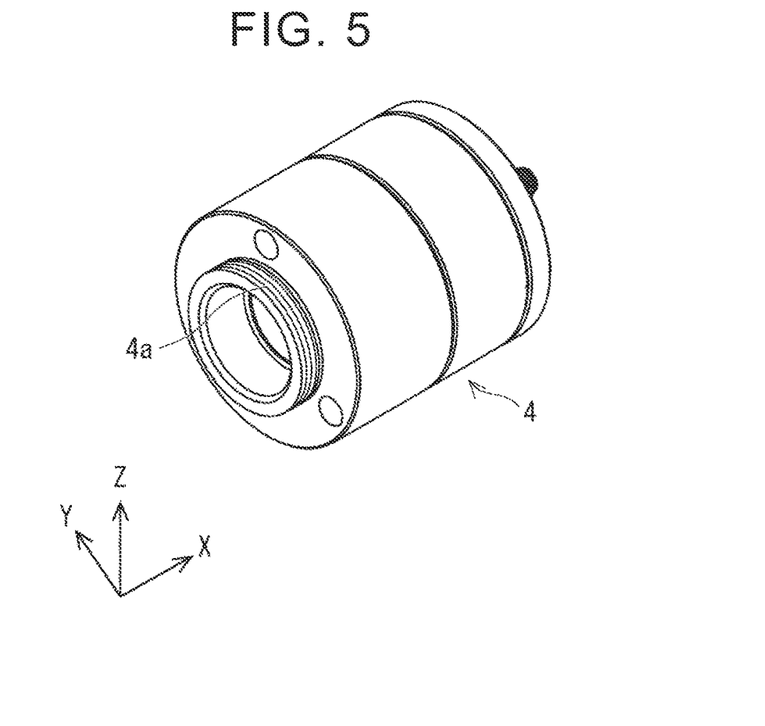
FIG. 5 is a perspective view illustrating a second photodetector according to the embodiment.

FIG. 1 is a perspective view illustrating the detection apparatus according to the present embodiment. FIG. 2 is an exploded view illustrating the detection apparatus according to the present embodiment. FIG. 3 is a view to describe the path of light of the detection apparatus according to the present embodiment. FIG. 4 is a perspective view illustrating a first photodetector according to the present embodiment. FIG. 5 is a perspective view illustrating a second photodetector according to the present embodiment. Note that, in FIG. 2, bolts are not illustrated. Here, the following description is made by use of a three-dimensional (XYZ) coordinate system to make the description clear.

As illustrated in FIGS. 1, 2, the detection apparatus 1 includes a first housing 2, a first photodetector 3, a second photodetector 4, a second housing 5, and a connecting plate 6, for example. As illustrated in FIGS. 1 to 3, the first housing 2 includes a housing body 21 and a dichroic mirror 22.

For example, as illustrated in FIG. 2, the housing body 21 has a hollow parallelepiped shape as a basic form and includes a first flat portion 21a, a second flat portion 21b, a third flat portion 21c, a fourth flat portion 21d, a fifth flat portion 21e, a sixth flat portion 21f, a first opening 21g, a second opening 21h, and a third opening 21i. Note that the arrangement of the flat portions and the openings to be described later is one example and can be changed appropriately depending on combinations or the like of other housings to constitute the detection apparatus.

For example, the first flat portion 21a and the second flat portion 21b are placed generally in parallel with an XY plane and face each other. The third flat portion 21c and the fourth flat portion 21d are placed generally in parallel with an XZ plane and face each other. The fifth flat portion 21e and the sixth flat portion 21f are placed generally in parallel with a YZ plane and face each other.

The first opening 21g penetrates through the first flat portion 21a in a Z-axis direction. The first opening 21g has a circular column shape as a basic form, for example, and an internal threaded portion 21j is formed on the peripheral surface of the first opening 21g.

The second opening 21h penetrates through the fifth flat portion 21e in an X-axis direction. The second opening 21h has a circular column shape as a basic form, for example, and an internal threaded portion 21k is formed on the peripheral surface of the second opening 21h.

The third opening 21i penetrates through the second flat portion 21b in the Z-axis direction. At this time, the first opening 21g and the third opening 21i are placed to generally overlap with each other when they are viewed from the Z-axis direction. The third opening 21i has a circular column shape as a basic form, for example, and the central axis of the first opening 21g and the central axis of the third opening 21i are placed to generally overlap with each other. Note that it is preferable that an internal threaded portion be also formed on the peripheral surface of the third opening 21i such that a photodetector or the like is connectable to the internal threaded portion.

The dichroic mirror 22 is placed inside the housing body 21 as illustrated in FIG. 3. More specifically, the dichroic mirror 22 allows light incident from the third opening 21i and having a first wavelength to pass through the dichroic mirror 22 and guides the light to the first opening 21g, while the dichroic mirror 22 reflects light having a second wavelength in the incident light and guides the light to the second opening 21h.

The first photodetector 3 is configured to detect light by photoelectric conversion and includes, for example, a photo diode. An end portion of the first photodetector 3 on a negative Z-axis side has a cylindrical shape as illustrated in FIG. 4, and an external threaded portion 3a is formed on the peripheral surface of the end portion on the negative Z-axis side.

When the external threaded portion 3a of the first photodetector 3 is screwed into the internal threaded portion 21j of the first opening 21g of the first housing 2, the first photodetector 3 is connected to the first housing 2. Accordingly, the internal threaded portion 21j of the first opening 21g of the first housing 2 functions as a connecting portion connectable with the first photodetector 3.

The second photodetector 4 is also configured to detect light by photoelectric conversion and includes, for example, a photo diode. An end portion of the second photodetector 4 on a negative X-axis side has a cylindrical shape as illustrated in FIG. 5, and an external threaded portion 4a is formed on the peripheral surface of the end portion on the negative X-axis side.

When the external threaded portion 4a of the second photodetector 4 is screwed into the internal threaded portion 21k of the second opening 21h of the first housing 2, the second photodetector 4 is connected to the first housing 2. Accordingly, the internal threaded portion 21k of the second opening 21h of the first housing 2 functions as a connecting portion connectable with the second photodetector 4.

The second housing 5 is placed on the negative Z-axis side from the first housing 2 as illustrated in FIGS. 1 to 3. The second housing 5 includes a housing body 51 and a half mirror 52. As illustrated in FIG. 2, for example, the housing body 51 has a hollow parallelepiped shape as a basic form and has a shape generally equivalent to the housing body 21 of the first housing 2.

The housing body 51 includes a first flat portion 51a, a second flat portion 51b, a third flat portion 51c, a fourth flat portion 51d, a fifth flat portion 51e, a sixth flat portion 51f, a first opening 51g, a second opening 51h, and a third opening 51i. Note that the arrangement of the flat portions and the openings to be described later is one example and can be changed appropriately depending on combinations or the like of other housings to constitute the detection apparatus.

For example, the first flat portion 51a and the second flat portion 51b are placed generally in parallel with the XY plane and face each other. The third flat portion 51c and the fourth flat portion 51*d* are placed generally in parallel with the XZ plane and face each other. The fifth flat portion 51*e* and the sixth flat portion 51*f* are placed generally in parallel with the YZ plane and face each other.

The first opening 51*g* penetrates through the first flat portion 51*a* in the Z-axis direction. The first opening 51*g* has a circular column shape as a basic form, for example, and as will be described later, in a state where the first housing 2 and the second housing 5 are connected to each other, the first opening 21*g* and the third opening 21*i* of the first housing 2 and the first opening 51*g* of the second housing 5 are placed to generally overlap with each other.

At this time, for example, as will be described later, in a state where the first housing 2 is connected to the second housing 5, the central axis of the first opening 21*g* of the first housing 2, the central axis of the third opening 21*i* of the first housing 2, and the central axis of the first opening 51*g* of the second housing 5 are placed to generally overlap with each other.

The second opening 51*h* penetrates through the fifth flat portion 51*e* in the X-axis direction. Here, it is preferable that the fifth flat portion 51*e* of the second housing 5 be configured such that a camera (that is, a photodetector) 7 or the like for checking the application position of a laser beam to a processing point via the second opening 51*h* is connectable to the fifth flat portion 51*e* as illustrated in FIG. 3.

Meanwhile, in a case where the camera 7 or the like is not connected to the fifth flat portion 51*e* of the second housing 5, it is preferable that the fifth flat portion 51*e* be configured such that the second opening 51*h* can be covered with a cover 8 as illustrated in FIG. 1.

The third opening 51*i* penetrates through the sixth flat portion 51*f* in the X-axis direction. At this time, the second opening 51*h* and the third opening 51*i* are placed to generally overlap with each other when they are viewed from the X-axis direction. Note that the housing body 21 of the first housing 2 may be used as the housing body 51 of the second housing 5.

The half mirror 52 is placed inside the housing body 51 as illustrated in FIG. 3. More specifically, the half mirror 52 allows light incident from the third opening 51*i* to pass through the half mirror 52 and guides the light to the second opening 51*h* and also reflects and guides the light to the first opening 51*g*.

As illustrated in FIGS. 1, 2, the connecting plate 6 connects the first housing 2 and the second housing 5 stacked in the Z-axis direction to each other. The connecting plate 6 is placed to sandwich, in the Y-axis direction, the first housing 2 and the second housing 5 stacked in the Z-axis direction. That is, the connecting plate 6 sandwiches the first housing 2 and the second housing 5 from a direction generally perpendicular to the stacking direction of the first housing 2 and the second housing 5.

More specifically, in the present embodiment, a first connecting plate 61 and a second connecting plate 62 are provided as the connecting plate 6, as illustrated in FIG. 2. The first connecting plate 61 and the second connecting plate 62 have shapes generally equivalent to each other and have, as a basic form, a flat plate shape with its longitudinal direction being along the Z-axis direction.

In a state where the first connecting plate 61 is placed on a positive Y-axis side from the first housing 2 and the second housing 5 stacked in the Z-axis direction, the first connecting plate 61 is connected to the third flat portion 21*c* of the first housing 2 and the third flat portion 51*c* of the second housing 5 via bolts 9 such that the first connecting plate 61 is provided over the first housing 2 and the second housing 5.

In a state where the second connecting plate 62 is placed on a negative Y-axis side from the first housing 2 and the second housing 5 stacked in the Z-axis direction, the second connecting plate 62 is connected to the fourth flat portion 21*d* of the first housing 2 and the fourth flat portion 51*d* of the second housing 5 via bolts 9 such that the second connecting plate 62 is provided over the first housing 2 and the second housing 5.

Next will be described the procedure of assembling the detection apparatus 1 of the present embodiment. First, the first housing 2 is placed on a positive Z-axis side of the second housing 5 such that the first flat portion 51*a* of the second housing 5 generally makes surface contact with the second flat portion 21*b* of the first housing 2.

Subsequently, the first connecting plate 61 is placed on the positive Y-axis side from the first housing 2 and the second housing 5 such that the first connecting plate 61 is connected to the third flat portion 21*c* of the first housing 2 and the third flat portion 51*c* of the second housing 5 via the bolts 9.

Further, the second connecting plate 62 is placed on the negative Y-axis side from the first housing 2 and the second housing 5 such that the second connecting plate 62 is connected to the fourth flat portion 21*d* of the first housing 2 and the fourth flat portion 51*d* of the second housing 5 via the bolts 9.

Hereby, the first housing 2 and the second housing 5 can be connected to each other. At this time, the first opening 21*g* of the first housing 2, the third opening 21*i* of the first housing 2, and the first opening 51*g* of the second housing 5 are placed to generally overlap with each other when they are viewed from the Z-axis direction.

Here, when the first housing 2 and the second housing 5 having a parallelepiped shape as described above are connected to each other by sandwiching them between the first connecting plate 61 and the second connecting plate 62, it is possible to restrain the dichroic mirror 22 and the half mirror 52 from rotating around the Z-axis.

Besides, the first housing 2 and the second housing 5 can be connected to each other while deviation between the central axis of the first opening 21*g* of the first housing 2, the central axis of the third opening 21*i* of the first housing 2, and the central axis of the first opening 51*g* of the second housing 5 are restrained.

Subsequently, the external threaded portion 3*a* of the first photodetector 3 is screwed into the internal threaded portion 21*j* of the first opening 21*g* of the first housing 2. In addition to that, the external threaded portion 4*a* of the second photodetector 4 is screwed into the internal threaded portion 21*k* of the second opening 21*h* of the first housing 2. Hereby, the first photodetector 3 and the second photodetector 4 can be connected to the first housing 2.

Figure 6:
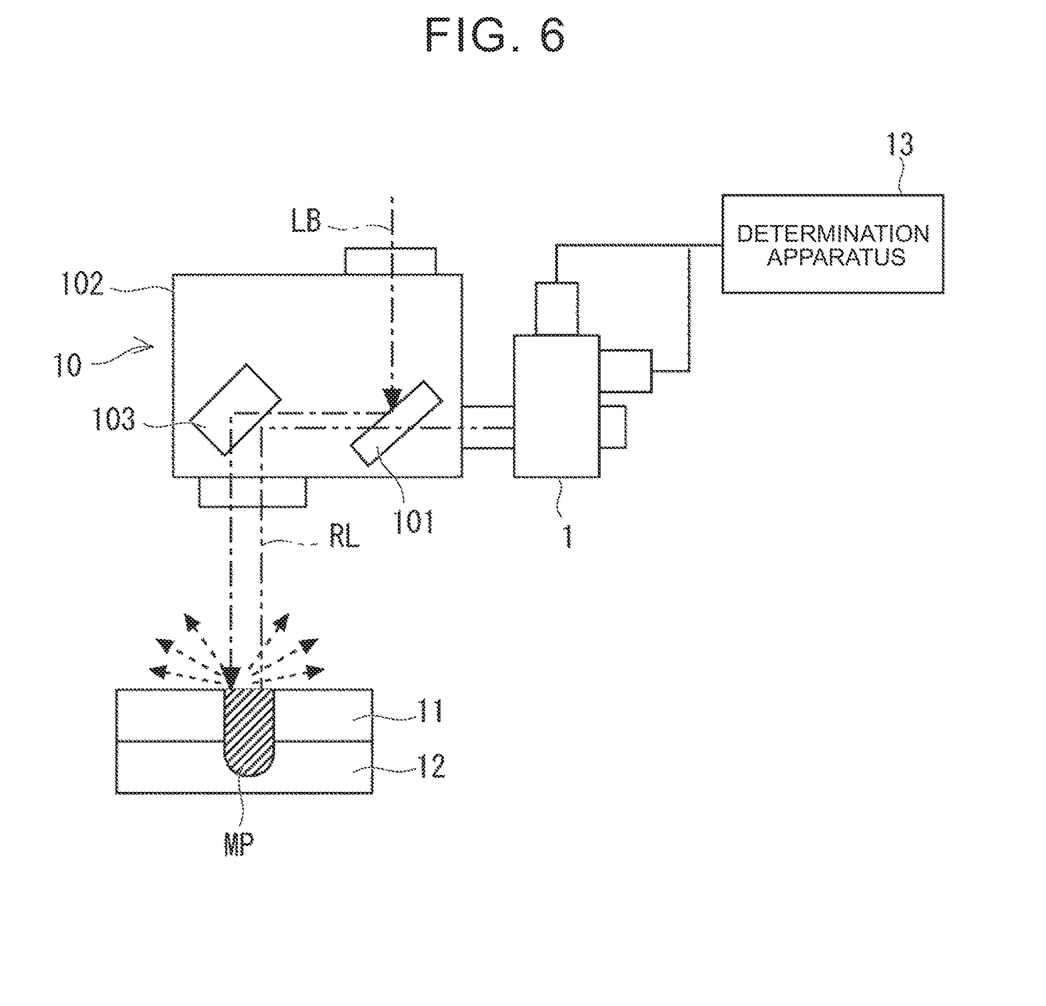
FIG. 6 is a view to describe a system configuration at the time of detecting returned light from a processing point of laser beam welding by use of the detection apparatus according to the embodiment.

As such, the first photodetector 3 and the second photodetector 4 are connected to the first housing 2 by a thread structure, the center of the first photodetector 3 can be placed generally on the central axis of the first opening 21*g* of the first housing 2 with accuracy, and the center of the second photodetector 4 can be placed generally on the central axis of the second opening 21*h* of the first housing 2 with accuracy, Next will be described the procedure for determining the quality of a welding state at a processing point of laser beam welding by use of the detection apparatus 1 of the present embodiment. FIG. 6 is a view to describe a system configuration at the time of detecting returned light from a processing point of laser beam welding by use of the detection apparatus of the present embodiment.

Here, as illustrated in FIG. 6, the detection apparatus 1 is connected to a welding head 10 such that, at the time when a laser beam LB is applied to perform lap joint between a first metal plate (that is, a reflector) 11 and a second metal plate 12 by use of the welding head 10, returned light RL reflected by a weld pool MP as a processing point is incident on the center of the third opening 51i of the second housing 5 of the detection apparatus 1. The first metal plate 11 is made of aluminum, iron, or the like, and the second metal plate 12 is made of aluminum, iron, or the like.

At this time, the first photodetector 3 and the second photodetector 4 of the detection apparatus 1 are electrically connected to a determination apparatus 13 configured to determine the quality of a welding state at the processing point based on a detected light intensity. Note that the detection apparatus 1 can be connected to the welding head 10 via a bracket 14 (see FIG. 3).

First, the laser beam LB incident on a housing 102 via a half mirror 101 of the welding head 10 is guided to a scanner 103, and after that, the laser beam LB is applied to a desired position of the first metal plate 11 by scanning by the scanner 103.

At this time, the returned light RL reflected by the weld pool MP is incident on the half mirror 101 via the scanner 103 and is guided to an opening of the housing 102 by passing through the half mirror 101, and then, the returned light RL is incident on the third opening 51i of the second housing 5 of the detection apparatus 1 from the opening of the housing 102.

Then, as illustrated in FIG. 3, the returned light RL is reflected by the half mirror 52 of the second housing 5 and is guided to the dichroic mirror 22 of the first housing 2 via the first opening 51g and the third opening 21i of the first housing 2.

In the meantime, the returned light RL passes through the half mirror 52 of the second housing 5 and is guided to the second opening 51h. At this time, in a case where the camera 7 is connected to the third flat portion 51c of the second housing 5, an application position of the laser beam LB can be observed by the camera 7.

After that, light RL1 having a first wavelength in the returned light RL passes through the dichroic mirror 22 and is guided to the first photodetector 3 via the first opening 21g. In the meantime, light RL2 having a second wavelength in the returned light RL is reflected by the dichroic mirror 22 and is guided to the second photodetector 4 via the second opening 21h.

At this time, in the detection apparatus 1 of the present embodiment, the dichroic mirror 22 and the half mirror 52 are restrained from rotating around the Z-axis. Besides, in the detection apparatus 1 of the present embodiment, the central axis of the first opening 21g of the first housing 2, the central axis of the third opening 21i of the first housing 2, and the central axis of the first opening 51g of the second housing 5 are placed to generally overlap with each other.

Further, in the detection apparatus 1 of the present embodiment, the center of the first photodetector 3 is placed generally on the central axis of the first opening 21g of the first housing 2, and the center of the second photodetector 4 is placed generally on the central axis of the second opening 21h of the first housing 2.

Accordingly, while deviation of the optical path of the returned light RL is restrained, it is possible to generally guide the light RL1 having the first wavelength in the returned to the center of the first photodetector 3 in the returned light RL with accuracy, and it is also possible to generally guide the light RL2 having the second wavelength in the returned light RL to the center of the second photodetector 4 with accuracy. Hereby, the detection apparatus 1 of the present embodiment can improve in detection accuracy of the returned light RL.

Subsequently, the first photodetector 3 electrically converts the light RL1 having the first wavelength in the returned light RL and outputs a signal indicative of the light intensity of the light RL1 to the determination apparatus 13. In the meantime, the second photodetector 4 electrically converts the light RL2 having the second wavelength in the returned light RL and outputs a signal indicative of the light intensity of the light RL2 to the determination apparatus 13.

Subsequently, the determination apparatus 13 determines the quality of the welding state at the processing point of laser beam welding based on the light intensities indicated by the input signals. In a case where the difference, at each time point, between the waveform of the light intensity indicated by signals sequentially input and a predetermined reference waveform is larger than a predetermined threshold, for example, the determination apparatus 13 determines that the welding state at the processing point is poor.

In the meantime, in a case where the difference, at each time point, between the waveform of the light intensity indicated by the signals sequentially input and the predetermined reference waveform is equal to or less than the predetermined threshold, for example, the determination apparatus 13 determines that the welding state at the processing point is good.

Figure 7:
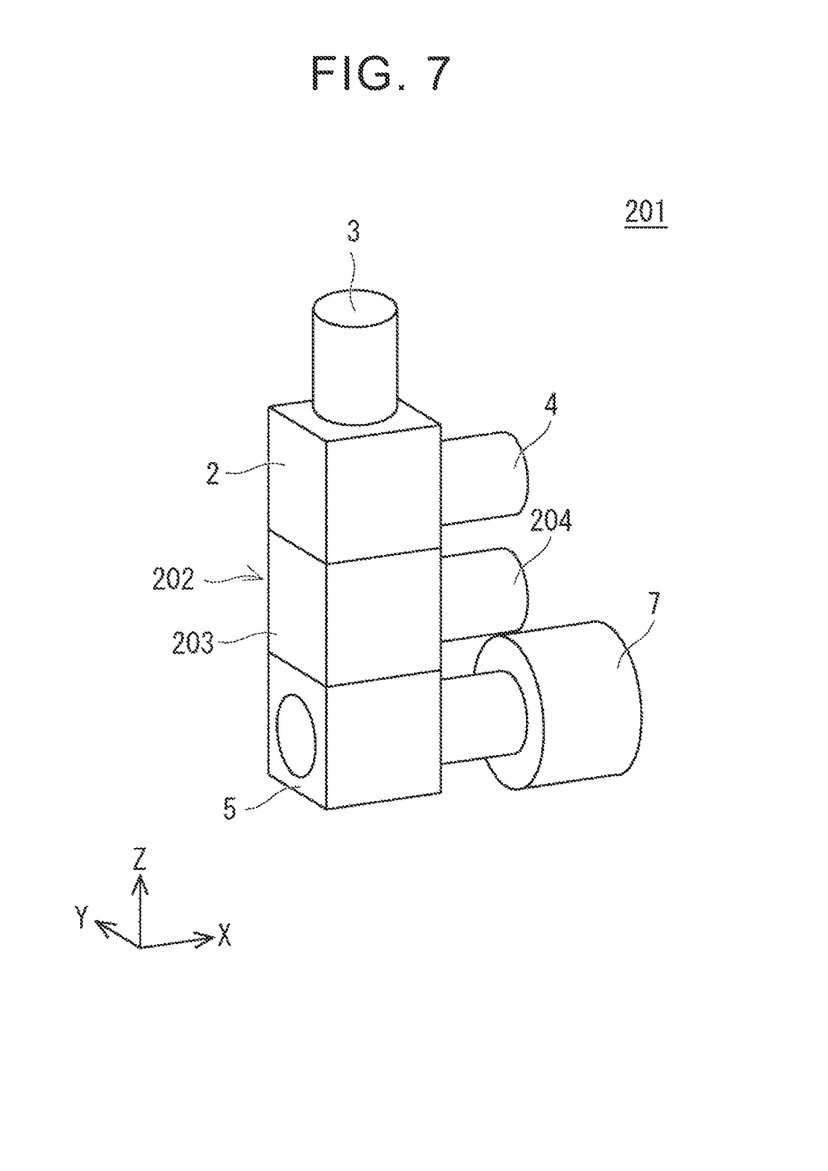
FIG. 7 is a perspective view illustrating a detection apparatus according to Combination Example 1.
Figure 8:
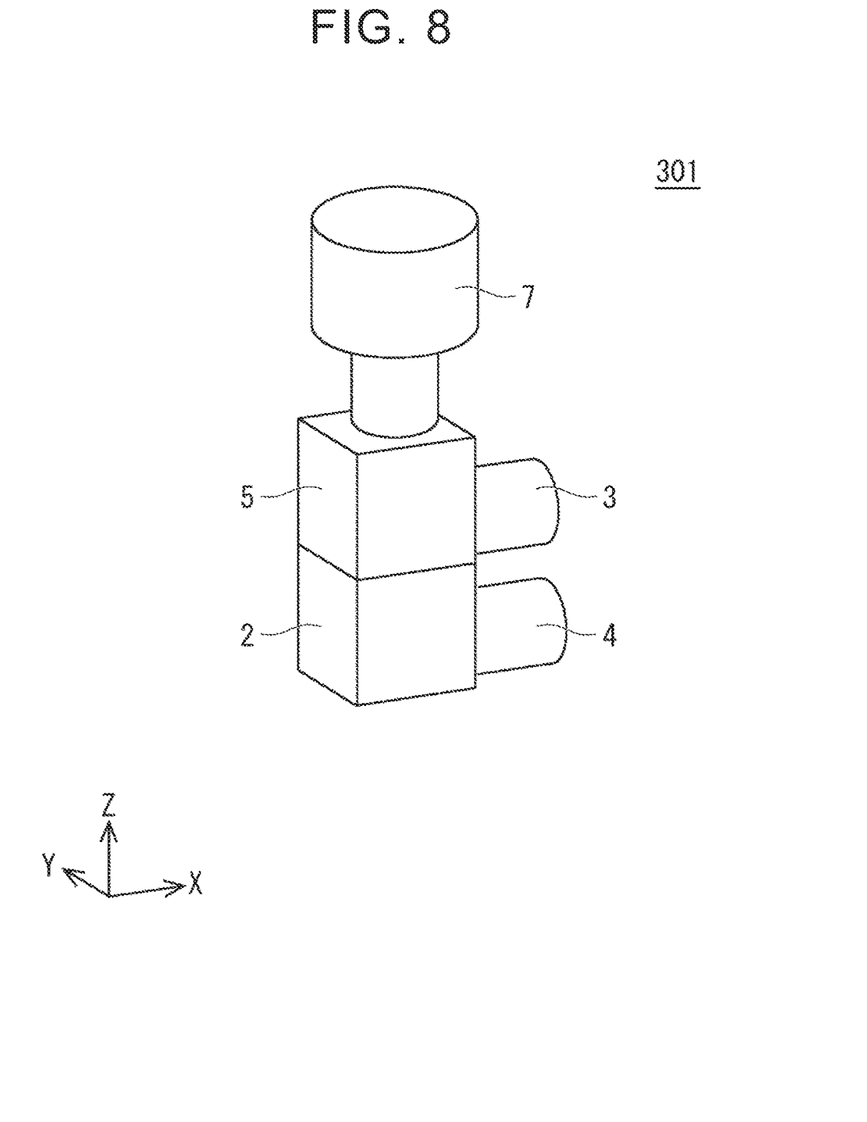
FIG. 8 is a perspective view illustrating a detection apparatus according to Combination Example 2.

Next will be described examples of a different combination in the detection apparatus using the first housing 2, the first photodetector 3, and the second photodetector 4. FIG. 7 is a perspective view illustrating a detection apparatus according to Combination Example 1. FIG. 8 is a perspective view illustrating a detection apparatus according to Combination Example 2.

A detection apparatus 201 according to Example 1 of the different combination is configured such that a third housing 202 is placed between the first housing 2 and the second housing 5 in the detection apparatus 1 as illustrated in FIG. 7. The third housing 202 includes, for example, a housing body 203 and a dichroic mirror.

As the housing body 203, the housing body 21 of the first housing 2 can be used, for example. By screwing an external threaded portion of a third photodetector 204 into an internal threaded portion formed in a second opening of the housing body 203, the third photodetector 204 is connected to the third housing 202.

The dichroic mirror is placed inside the housing body 203. More specifically, the dichroic mirror guides light incident from a third opening of the housing body 203 and having a third wavelength to the second opening of the housing body 203, while the dichroic mirror guides, to a first opening of the housing body 203, light having other wavelengths in the light incident from the third opening.

With such a configuration, the detection apparatus 201 additionally provided with the third housing 202 and the third photodetector 204 can be easily assembled.

A detection apparatus 301 according to Combination Example 2 is configured such that the first housing 2 in the detection apparatus 1 is placed on the negative Z-axis side from the second housing 5, as illustrated in FIG. 8. At this time, the housing body 21 of the first housing 2 should be used as the housing body 51 of the second housing 5.

More specifically, for example, the second housing 5 is placed on the positive Z-axis side of the first housing 2 such that the first flat portion 21a of the first housing 2 in a state where the first photodetector 3 connected to the first housing 2 in the detection apparatus 1 is removed generally makes surface contact with the sixth flat portion 51f of the second housing 5 in a state where the second housing 5 of the detection apparatus 1 is rotated counterclockwise around the Y-axis by 90° and is rotated around Z-axis by 180°. At this time, the first opening 21g of the first housing 2 and the third opening 51i of the second housing 5 are placed to communicate with each other in the Z-axis direction.

Then, for example, by screwing the external threaded portion 3a of the first photodetector 3 into an internal threaded portion formed in the first opening 51g of the second housing 5, the first photodetector 3 is connected to the second housing 5. In the detection apparatus 301 configured as such, the returned light RL from the welding head 10 is incident on the third opening 21i of the first housing 2 placed in a part of the detection apparatus 301 on the negative Z-axis side.

As such, the detection apparatus 1, 201, 301 of the present embodiment can be configured by combining a housing provided with a half mirror, other photodetectors, and so on with the first housing 2 provided with the dichroic mirror 22, the first photodetector 3, and the second photodetector 4.

Accordingly, the arrangement of the photodetectors and so on can be changed appropriately depending on the condition such as a space around the welding head 10. Further, the first photodetector 3 and the second photodetector 4 can be connected to the first housing 2 by replacing the first photodetector 3 and the second photodetector 4 with each other. Besides, it is possible to easily increase and decrease the number of necessary photodetectors.

Further, it is possible to configure a detection apparatus at a low cost by combinations of the first housing 2 provided with the dichroic mirror 22, the first photodetector 3, the second photodetector 4, a housing provided with a half mirror, other photodetectors, and so on.

Besides, in a case where the housing body 21 of the first housing 2 is used for other housings, that is, in a case the housings are commonized (used in a multipurpose manner), it is possible to configure the detection apparatus at a lower cost. At this time, in a case where the second flat portion 21b of the housing body 21 in the first housing 2 has a configuration where a photodetector or the like is connectable to the second flat portion 21b, it is possible to more freely combine the first housing 2 provided with the dichroic mirror 22, the first photodetector 3, the second photodetector 4, a housing provided with a half mirror, other photodetectors, and so on with each other.

In a case where either of the first photodetector 3 and the second photodetector 4 is connected to a housing by threaded engagement of the external threaded portion in the either of the first photodetector 3 and the second photodetector 4 with an internal threaded portion of the housing, it is possible to place the center of the either of the first photodetector 3 and the second photodetector 4 generally on the central axis of an opening of the housing with accuracy. On this account, the detection apparatus 1, 201, 301 of the present embodiment can improve in detection accuracy of the returned light RL.

Further, in a case where parallelepiped-shaped housings are connected to each other by sandwiching them by the connecting plate 6, it is possible to restrain the dichroic mirror 22 and the half mirror 52 from rotating around the Z-axis, for example. Besides, for example, it is possible to restrain deviation between the central axis of the first opening 21g of the first housing 2, the central axis of the third opening 21i of the first housing 2, and the central axis of the first opening 51g of the second housing 5. Accordingly, it is possible to minimize deviation in the optical path of the returned light RL, thereby making it possible to improve the detection accuracy of the returned light RL.

The disclosure is not limited to the above embodiment, and various modifications can be made within a range that does not deviate from the gist of the disclosure.

For example, the embodiment deals with a case where each of the housings has a parallelepiped shape, but the shape of each of the housings is not limited. Further, the shapes of the openings in each of the housings are also not limited. In short, the shape of each of the housings or the shapes of the openings in each of the housing should be a shape that allows returned light from a processing point to be guided to the first photodetector 3 and the second photodetector 4 in a state where the housings are connected to each other.

What is claimed is:

1. A detection apparatus for detecting returned light of a laser beam applied to a reflector, the detection apparatus comprising:
   two or more housings connectable to each other;
   a first photodetector connectable to a corresponding one of the two or more housings; and
   a second photodetector connectable to a corresponding one of the two or more housings, wherein:
   each of the two or more housings includes
      a first opening formed in the each of the two or more housings,
      a first connecting portion to which the first photodetector is connectable such that the first photodetector detects light incident on the first opening, the first connecting portion being placed on a surface of the each of the two or more housings, the surface being a surface where the first opening is formed,
      a second opening formed in the each of the two or more housings,
      a second connecting portion to which the second photodetector is connectable such that the second photodetector detects light incident on the second opening, the second connecting portion being placed on a surface of the each of the two or more housings, the surface being a surface where the second opening is formed, and
      a third opening formed in the each of the two or more housings such that the third opening faces the first connecting portion;
   at least one of the two or more housings includes a dichroic mirror placed between the first opening and the third opening; and
   the dichroic mirror allows light having a first wavelength in incident light from the third opening to pass through the dichroic mirror toward the first opening, while the dichroic mirror reflects light having a second wavelength in the incident light toward the second opening.

2. The detection apparatus according to claim 1, wherein:
   the first connecting portion includes a first internal threaded portion formed on a peripheral surface of the first opening of the each of the two or more housings; and
   an external threaded portion formed in the first photodetector is screwed into the first internal threaded portion such that the each of the two or more housings is connected to the first photodetector.

3. The detection apparatus according to claim 1, wherein:
the second connecting portion includes a second internal threaded portion formed on a peripheral surface of the second opening of the each of the two or more housings; and
an external threaded portion formed in the second photodetector is screwed into the second internal threaded portion such that the each of the two or more housings is connected to the second photodetector.

4. The detection apparatus according to claim 1, wherein the each of the two or more housings includes a third connecting portion to which either of the first photodetector and the second photodetector is connectable such that the either of the first photodetector and the second photodetector detects light incident on the third opening, the third connecting portion being placed on a surface of the each of the two or more housings, the surface being a surface where the third opening is formed.

5. The detection apparatus according to claim 4, wherein:
the third connecting portion includes a third internal threaded portion formed on a peripheral surface of the third opening of the each of the two or more housings; and
an external threaded portion formed in the first photodetector or an external threaded portion formed in the second photodetector is screwed into the third internal threaded portion such that the each of the two or more housings is connected to a corresponding one of the first photodetector and the second photodetector.

6. The detection apparatus according to claim 1, comprising a connecting plate by which the two or more housings are connected to each other, wherein the connecting plate is placed to sandwich the two or more housings.

* * * * *